Jan. 24, 1961 F. BLOCH 2,969,290
SALTING OF SPLIT PISTACHIO NUTS
Filed Aug. 28, 1959
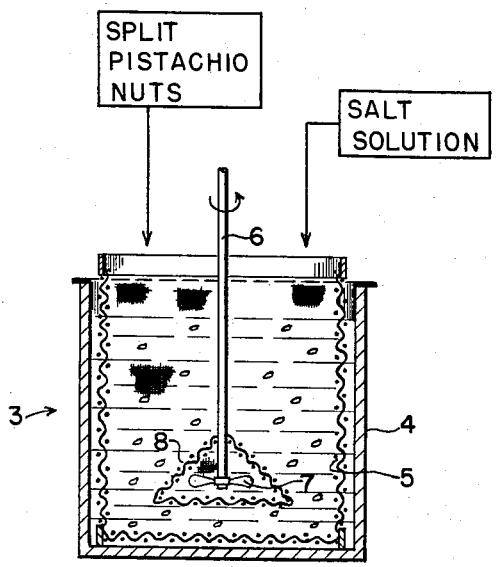
FELIX BLOCH
INVENTOR
BY
ATTORNEY

2,969,290

SALTING OF SPLIT PISTACHIO NUTS

Felix Bloch, Oakland, Calif., assignor to the United States of America as represented by the Secretary of Agriculture Filed Aug. 28, 1959, Ser. No. 836,832

2 Claims. (Cl. 99—127)

(Granted under Title 35, U.S. Code (1952), sec. 266)

A non-exclusive, irrevocable, royalty-free license in the invention herein described throughout the world for all purposes of the United States Government, with the power to grant sub-licenses for such purposes, is hereby granted to the Government of the United States of America.

This invention relates to and has among its objects the provision of novel processes for salting pistachio nuts. Further objects and advantages of the invention will be evident from the following description wherein parts and percentages are by weight, unless otherwise specified.

The single figure in the annexed drawing illustrates apparatus with which the process of the invention may be carried out.

It is well known in the art to which the invention pertains that orchard-run lots of pistachio nuts are not of uniform grade but contain nuts of varying commercial value. Primarily, any orchard-run lot will be found to contain (a) split nuts and (b) unsplit nuts. Those in the first category are referred to as split nuts because their shells are partly open along their seams. Botanically, this is described as a splitting of the endocarp into two valves along the keel. The appearance of these nuts may be likened to a partly open clam shell. The split nuts are of the highest quality as they contain mature, plump, full-sized kernels. Also, they are preferred by the consumer because the kernel is more readily removed from the shell. The unsplit (closed shell) nuts are of lower value because in most of them the kernels are small and immature. It is conventional practice to sort the nuts to segregate the split nuts from the less desirable grades. The split nuts are then prepared for sale for ultimate consumption. This preparation involves such procedures as drying, salting and roasting.

Conventionally, the split nuts are salted prior to or during the roasting operation by soaking them in a salt solution or by spraying a salt solution on the nuts. Neither method gives a satisfactory result as the individual nuts vary considerably in salt content, and, therefore, in taste. The prior methods are also slow in that the nuts must be maintained in contact with the salt solution for considerable periods of time to obtain a desired degree of saltiness.

In accordance with the present invention, salting is achieved by a method which yields more uniform deposition of salt on individual nuts and which requires a much shorter time than by prior methods. These objects are attained by introducing the split nuts into a salt solution and applying centrifugal action to displace the air trapped within the nuts. In this way the salt solution replaces the air normally contained within the shells so that the kernels become properly coated with salt.

The step of subjecting the nuts to centrifugal action may be accomplished in various ways. For example, the salt solution and nuts may be introduced into a vessel which is then rotated to develop the centrifugal force. If desired, the equipment used for this purpose may be a conventional centrifuge equipped with an imperforate bowl. In the alternative, the vessel itself is not rotated but rotation is applied only to the contents, that is, the salt solution and nuts. To this end, the salt solution and nuts are placed in a vessel provided with means therein for rotating the contents. This means may take the form of a rotatable device such as a propeller, impellor, disc, vanes, baffles, or the like. Conventional devices used for high-speed mixing and agitating of liquids are eminently suitable for use in the process. Generally, where a rotating propeller or the like is used it is preferred to employ a guard of screening or the like to prevent the propeller blades from striking and breaking the nuts.

It is thus evident that various forms of equipment are suitable for use in the process of the invention. The particular construction of the device used is of no moment as long as the nuts are caused to rotate at a sufficient speed that air trapped within the split nuts is displaced by salt solution. Such items as speed of rotation and time during which the rotation is applied will vary depending on such considerations as the size of the equipment, particularly as it affects the radius of rotation, the efficiency with which the mass of nuts and water is rotated, etc.

The step of applying centrifugal force to the nuts while in a body of salt solution is a critical feature of the process of the invention. Thus, if the nuts are merely soaked in salt solution or mixed with salt solution without sufficient centrifugal action to displace trapped air, then the salting operation is inefficient as requiring long treatment times and even then giving a product of non-uniform salt content. This ineffectiveness is caused by the air trapped within the open nut shells which retards penetration of the salt solution.

Reference is now made to the drawing which depicts apparatus with which the process of the invention may be carried out. The split pistachio nuts from bin 1 and salt solution from container 2 are fed into salting device 3. This device includes tank 4, basket 5 made of screening, and an agitator comprising shaft 6 and propeller 7. Shaft 6 is rotated by a suitable device such as an electric motor (not illustrated). A cage 8 having a generally-conical shape and made of screening is positioned about propeller 7 and attached at its upper end to shaft 6. This cage prevents the propeller from directly contacting the nuts; such contact would tend to break them.

In operation, tank 4 is filled with salt solution and the split nuts are introduced into basket 5. Shaft 6 is then rotated at a speed sufficient to induce a thorough agitation and a rapid circulation of the nuts about the interior of basket 5. This rotational effect is continued for a time long enough to ensure removal, by centrifugal action, of air entrapped within the shells of the split nuts. Depending on the efficacy of the agitator used this result may be obtained in a few minutes or less. The agitation is then shut off and shaft 6 and associated mechanisms lifted out of the system. Basket 5 is then raised to separate the salted nuts from the solution.

After the salting operation, the nuts are dried and roasted in conventional manner to prepare them for use or sale. Ordinarily, the nuts are in dried condition prior to salting but re-drying is, of course, necessary to remove the moisture regained during the salting operation.

The salt solution used in the salting operation is simply common salt (NaCl) dissolved in water. The concentration of salt may be varied depending on the degree of saltiness desired in the final product—usually concentrations in the range of about from 10 to 25% are used.

The invention is further demonstrated by the following illustrative example:

*Example*

A. Using apparatus as described, 5 lbs. of split pistachio nuts (moisture content about 6%) were placed in basket 5 and 50 lbs. of salt solution was added to tank 4. The concentration of the solution was 15 lbs. salt per 100 lbs. water. Shaft 6 was rotated at a speed of about 1750 r.p.m. for one minute. The rotation was then stopped and the nuts removed from the solution. The salted nuts were then dried and roasted by subjecting them in a rotary kiln to a current of air initially at 160° F. and gradually increased to 248° F. Final moisture content of the nuts was about 1%. Analysis of the product indicated that the nuts contained 1.88% NaCl. Also, taste tests indicated that the individual nuts were uniform in saltiness.

B. In two comparative experiments, split pistachio nuts were salted by just soaking them for different periods of time in the salt solution. The salt solution was as in part A, above, as was the ratio of nuts to salt solution. After soaking, the nuts were dried and roasted as described in part A. Analysis of the products indicated that one lot of nuts soaked for 10 minutes had a salt content of 0.81%, the other lot soaked 20 minutes had a salt content of 0.96%. Taste tests indicated that the individual nuts in both these lots differed markedly as to saltiness.

Having thus described my invention, I claim:

1. A process of salting split pistachio nuts which comprises introducing said nuts into a body of salt solution, applying centrifugal action to the mixture of nuts and salt solution to an extent sufficient to replace air trapped within the shells of the split nuts by salt solution, discontinuing the application of centrifugal action and removing the salted nuts from the salt solution.

2. A process of salting split pistachio nuts which comprises introducing said nuts into a body of salt solution, applying rotational mechanical force to rotate the nuts at a velocity which develops centrifugal force adequate to replace air trapped within the shells of the split nuts by salt solution, discontinuing the application of said mechanical force, and removing the salted nuts from the salt solution.

References Cited in the file of this patent

UNITED STATES PATENTS

| | | |
|---|---|---|
| 1,397,187 | Tucker | Nov. 15, 1921 |
| 1,832,737 | Rassi | Nov. 17, 1931 |